United States Patent
Farla et al.

(10) Patent No.: US 7,260,098 B2
(45) Date of Patent: Aug. 21, 2007

(54) CYCLIC BUFFERING OF A DATASTREAM

(75) Inventors: Rob C Farla, The-Hague (NL); Steef P Grimbergen, Leusden (NL)

(73) Assignee: Lucent Technologies Inc., Murray Hill, NJ (US)

( * ) Notice: Subject to any disclaimer, the term of this patent is extended or adjusted under 35 U.S.C. 154(b) by 999 days.

(21) Appl. No.: 10/255,272

(22) Filed: Sep. 26, 2002

(65) Prior Publication Data

US 2004/0062247 A1  Apr. 1, 2004

(51) Int. Cl.
*H04L 12/28* (2006.01)
*H04L 12/56* (2006.01)

(52) U.S. Cl. ..................................... 370/394
(58) Field of Classification Search ............... 370/394, 370/352, 351, 474, 539; 713/276, 168; 709/19, 709/20
See application file for complete search history.

(56) References Cited

U.S. PATENT DOCUMENTS

2002/0163939 A1* 11/2002 Grimbergen ................ 370/474

OTHER PUBLICATIONS

Peter A. Alsberg, Extensible data features in the operating system language OSL/2, Oct. 1971, ACM Press, Proceedings of the third ACM symposium on Operating systems principles.*

* cited by examiner

*Primary Examiner*—Chi Pham
*Assistant Examiner*—Prenell Jones

(57) ABSTRACT

Data is distributed over multiple connections through a network in successive groups of containers such that respective containers of each group are transmitted via respective ones of the connections. Each container contains an identifier of the group to which the container belongs. The output of the network data from containers that have been received is buffered to compensate differences in the delays of transport via different connections. An oldest identifier value received via the connections during a time frame is detected by determining a plurality of respective minimum values of the identifiers received in the time frame. Each minimum value is determined among received identifiers from a respective sub-range of possible identifier values. A "sequentially first" sub-range of successive sub-ranges, for which at least one of the minimum values has been determined, is then determined. The minimum value of the "sequentially first" sub-range is then selected as the oldest identifier.

7 Claims, 2 Drawing Sheets

CYCLIC BUFFERING OF A DATASTREAM

TECHNICAL FIELD

The invention relates generally to data communications systems and, in particular, to a device for use in such systems and a method for transporting data via such systems.

BACKGROUND OF THE INVENTION

It is known to transport data via telecommunication networks using virtual concatenation of transport containers. In such a transport arrangement, a plurality of connections through the telecommunication network are used in parallel. More specifically, data is distributed over the connections in the following manner. A stream of data is split into blocks and the blocks are transmitted through the connections in messages that are called containers. The containers are organized into groups of containers. In general, each group contains as many containers as the number of available connections. Successive groups correspond to successive time segments of the data stream, each segment containing the blocks that are transmitted in the containers of the group. Each time frame (time slot) of the operation of the communications system corresponds to transmission of a group of containers, e.g., different containers from the group are transmitted via different ones of the connections in the time frame.

At a receiving side, a plurality of containers are received in each time frame and the data stream is reassembled from the data in the containers. Due to the nature of the telecommunications system, the containers from different connections experience different delays between the time frame of transmission and the time frame of reception. Thus, it is generally guaranteed that the containers received over each connection individually are received in sequence, but there may be differences between the delays experienced by containers that are received over different connections. To reassemble the data stream in spite of these differences, the data from the containers in a group is buffered at the receiving side until it has been determined that all containers from the group have been received. Subsequently, data from the containers of the group is output in the order of original reception. For high bandwidth data streams, the amount of memory that is needed for buffering the data can be considerable. To minimize the amount of memory, it is desirable that the data is not buffered for unnecessarily long periods. The data from a group of containers should be output as soon as it has been detected that all containers of the group have been received.

In order to make it possible to detect when all containers from a group have arrived, an identifier is transmitted with each container. The identifier identifies the group to which the container belongs. In one example, this identifier is called the MFRI (MultiFRame Identifier), for which a 12 bit number may be used. This number may wrap around each time after 4096 groups, for example. At the receiving side, data from each group of containers may be output when all containers with the MFRI of that group have been received from the different connections. The MFRI of the oldest group that has been completed in a time frame can be detected from the oldest MFRI from the set of containers that has been received in that time frame, provided containers have been received from all connections. The determination of the oldest MFRI requires comparisons involving all MFRI's. This determination is complicated, moreover, by the fact that it does not suffice to look for the lowest MFRI to determine the oldest MFRI, because the MFRI may wrap around. In addition, it has to be checked whether the delays experienced via different ones of the connections do not differ so much that more than the available memory is needed to compensate the differences.

In practice it has been found that this detection process is hard to implement with sufficient speed without very complex circuitry. It is especially difficult to implement comparisons at the clock rate that is needed to operate the system at sufficient speed in high bandwidth applications.

SUMMARY OF THE INVENTION

According to the principles of the invention, data is transmitted over different connections of a data communications network such that simple circuitry can be used to determine, at high speed, when containers of a group have been received over the different connections.

According to one illustrative embodiment, the oldest identifier associated with the containers of a group is determined by determining respective minimum values of the identifiers received in a time frame, where each minimum value is determined among received identifiers from a respective sub-range of possible identifier values. A sequentially first sub-range of successive sub-ranges, for which at least one of the minimum values has been determined, is then identified. The minimum value of the sequentially first sub-range is then selected as the oldest identifier.

According to the principles of the invention, the detection of completion of reception of all containers from each group is sped up because the comparison steps for comparing identifiers are shortened, thereby making it possible to fit the comparisons in a short clock cycle. This is achieved by performing detection in a way that avoids comparisons other than comparisons of identifier values from limited sub-ranges or adjacent sub-ranges. Thus, only a number of less significant bits of the identifiers needs to be compared. The shortened clock cycle also makes it possible to pipe-line the detection process.

According to another illustrative embodiment, the size of the sub-ranges is matched to the size of the buffer memory so that, when the buffer memory has a capacity for storing data from a number Q of groups of containers simultaneously, each sub-range contains Q possible identifier values. The result is simplified detection as compared to prior arrangements. The size of the buffer memory determines the maximum difference between the delays that can be compensated. Larger differences, which express themselves in large differences between the identifiers, lead to errors. By matching the size of the sub-ranges to the size of the memory, it can be ensured that the identifiers are in at most two adjacent sub-ranges when the differences in the delays are within the range that can be handled by the buffer memory. The identification of the collection of successive sub-ranges that contains the identifiers is also simplified as compared to prior arrangements.

According to yet another illustrative embodiment, error signals are generated when the differences between the delays exceed the compensatory capacity of the buffer memory. Of course, this may only be needed if such differences cannot be excluded a priori and protection against error is needed. The errors are detected using the sub-ranges, by determining respective maximum values of the identifiers received in the time frame, wherein each maximum value is determined for identifiers from a respective one of the sub-ranges. A sequentially last sub-range of a plurality of successive sub-ranges, for which one of the minimum values have been determined, is then determined. A maximum value of a sequentially last sub-range is selected and compared with the minimum value from the sequentially first sub-range. An error is reported if the first test is negative or the selected maximum value differs more than a predetermined amount from the selected minimum value. The result is simplified detection of errors since only less significant parts of the identifiers need to be compared.

BRIEF DESCRIPTION OF THE DRAWING

A more complete understanding of the invention may be obtained from consideration of the following detailed description of the invention in conjunction with the drawing, with like elements referenced with like reference numerals, in which.

DETAILED DESCRIPTION

Figure 1:
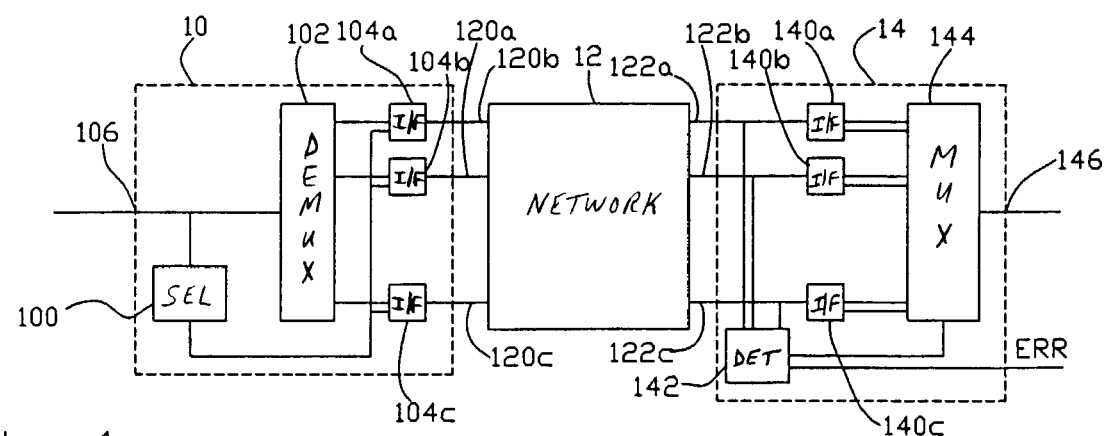
FIG. 1 shows a communication system.

FIG. 1 shows a communication system. The system contains an input interface 10, a network 12 and an output interface 14. The input interface 10 contains a group selection unit 100, a demultiplexer 102 and a plurality of connection input interfaces 104a-c. An input 106 of the input interface 10 is coupled to an input of demultiplexer 102. Outputs of demultiplexer 102 are coupled to connection inputs 120a-c of network 12 via respective ones of the connection input interfaces 104a-c. Group selection unit 100 is coupled between input 106 of input interface and inputs of respective ones of the connection input interfaces 104a-c.

Output interface 14 contains a plurality of connection output interfaces 140a-c, a detector 142 and a multiplexer 144. Connection outputs 122a-c of network 12 are coupled to inputs of multiplexer 144 via respective ones of connection output interfaces 140a-c. Multiplexer 144 has an output coupled to an output 146 of output interface 14. Connection outputs 122a-c of network 12 are coupled to inputs of detector 142, which has an output coupled to multiplexer 144.

In operation, a stream of data is supplied to input 106. Input interface 10 splits the stream into a plurality of sub-streams. Each of the sub-streams is transported via a respective connection through network 12. Output interface 14 reassembles the sub-streams to an output stream at output 146. The system of FIG. 1 illustrates an example of an implementation of this process.

Group selection unit 100 segments this data into successive groups of data items and assigns an identifier to each group. Identifiers that represent respective successive numbers are assigned to respective successive groups. This may be realized for example by taking the identifier from an n-bit binary counter (not shown) whose content is incremented once for each group, wrapping around to zero when the maximum count value has been reached. In this case, $L=2_n$ different identifier values may be formed. Group selection unit 100 supplies the identifiers to the connection input interfaces 104a-c.

Demultiplexer 102 splits the data from each group into m blocks of data-items (m being a positive integer number that may assume values greater than 1) and supplies the data items of each block to a respective one of the connection input interfaces 104a-c (there being m-connection interfaces 104a-c, only three being shown in FIG. 1). Connection input interfaces 104a-c form message packets, which will be called containers. Each container contains the data from a respective one of the blocks and the identifier of the group to which the block belongs. Connection input interfaces 104a-c output the containers to network 12.

Network 12, which may be a conventional telephone network, establishes m data transport connections between its inputs 120a-c and outputs 122a-c. Network 12 operates in successive time intervals, termed "frames" of, for example, 125 microseconds. In each frame, the network inputs m containers of a single group, one from each connection input interface 104a-c, and transmits the containers to the outputs 122a-c through the established connections. At the outputs 122a-c of the network, m containers are output in each time frame, one from each connection.

The connections may be established along any path through network 12. Different ones of the connections may be established through different paths that cause different delays. As a result, the containers that are output in any single frame at outputs 122a-c of network 12 will not generally belong to a single group.

Output interface 14 receives the containers from the connections through network 12 and stores the data from the containers in connection output interfaces 140a-c. The data from the containers of a group remains stored in the connection output interfaces 140a-c until all containers of that group have been received. Detector 142 detects when all containers of a group have been received. When all containers of a group have been received, multiplexer 144 reads the data from the containers of this group and reassembles this data to reconstruct an output data stream at output 146 that reproduces the input data stream from input 106.

Connection output interfaces 140a-c each contains a memory (not shown) with sufficient space to store the data from a plurality of the containers, e.g., Q containers. In general, sufficient memory space should be available to store data from at least Q=D containers, where D is the maximum expected difference between the delays experienced via different ones of the connections through network 12, in terms of the number of frames that occur from reception of the first container to reception of the last container of the containers that were transmitted in a single frame at the input of network 12.

Preferably, the identifier of the group to which each container belongs is used to form an address to select a location in the memory at which the data from the container is stored. The least significant p bits of the identifier may be used for example, when they are capable of addressing Q different addresses. In general, D (the maximum difference between the delays) and Q (the number of addresses for different containers) are much smaller than L (the number of different possible identifier values). In this case, when it has been determined that all containers from a group with identifier "i" have been received, multiplexer 144 may use the least significant p bits of the identifier to address a location for a container in the memories in connection output interfaces 140a-c to retrieve the data for the containers from that group.

Detector 142 detects whether all containers of a group have been received by determining the value of the oldest identifier received in a time frame. It may be concluded that all containers of the group identified by the oldest container have then been received, since reception of a container with younger identifiers guarantees that containers with older identifiers have already been received, because transport through each individual connection does not affect the sequence of the containers transported through that connection.

Detection thus requires the comparison of a number of identifier values. To reduce the time needed to perform detection an algorithm has been created in which in different steps each time only part of the bits of different identifiers is compared directly. This reduces the time needed to execute each step, so that the minimum clock cycle time for the detection circuitry is reduced. Thus, the speed with which detection can be executed may be increased, even though more comparisons are needed, for example, because the different comparisons can be executed in pipelined fashion.

Figure 2:
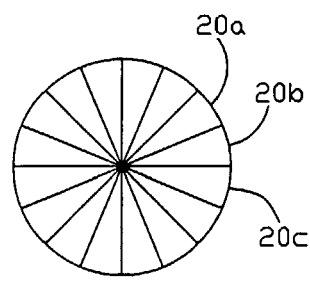
FIG. 2 illustrates the determination of an oldest received identifier according to the principles of the invention.

FIG. 2 illustrates the determination of the oldest identifier in a way that avoids comparisons of full identifiers. FIG. 2 shows a circle that symbolizes the range of possible values of the identifiers of the groups, the values increasing generally in the clockwise direction. The fact that a circle is used symbolizes that the value of the identifier at one point wraps around back to its minimum value when it passes its maximum value. The circle contains segments $20a$-$c$. Each segment of the circle symbolizes a sub-range of the possible values of the identifier.

Graphically speaking, the effect of detector 142 is that it determines whether there is a collection of consecutive circle segments $20a$-$c$ that contain all identifier values that have been received in a time frame, so that the number of circle segments in the collection does not exceed a threshold value T. The threshold value T is selected dependent on the number Q of containers for which data can be stored in connection output interfaces $140a$-$c$, so that the number of identifier values in the combined range of identifier values with T successive values of the more significant part does not exceed Q plus the number of identifiers in a single circle segment $20a$-$c$. If there is no such collection with less than T successive circle segments, detector 142 generates an error signal, to indicate that the difference between the delays experienced via different connections exceeds the maximum that can be compensated by the connection output interfaces $140a$-$c$.

Preferably, the number of identifier values represented by each circle segment equals Q. In this case, all values should be contained in a collection of two consecutive circle segments $20a$-$c$: T=2. The error signal is generated when the identifiers are not contained in two consecutive circle segments $20a$-$c$.

Detector 142 also determines minimum and maximum values for each circle segment $20a$-$c$. The minimum and maximum value represent the minimum and maximum of the received identifiers with a value in the segment. The determination of the minima and maxima per segment requires a comparison of fewer bits of the identifiers than the determination of minima and maxima overall and is therefore faster.

Detector 142 determines the value of the minimum of the identifiers in the first circle segment $20a$-$c$ of the collection ("first" that is seen travelling in the direction of generally increasing identifier values, that is, the clockwise direction). Similarly, detector 142 determines the maximum of the identifiers in the last circuit segment $20a$-$c$ of the collection ("last" also in clockwise direction). Detector 142 checks whether the difference between this maximum and minimum exceeds the number Q of available locations for containers. If so, detector 142 generates an error signal, to indicate excessive differences between the delays.

Detector 142 outputs the identifier that corresponds to the minimum value of the first circle segment $20a$-$c$ to multiplexer 144. Multiplexer 144 uses this value to retrieve the containers that correspond to this minimum value from connection output interfaces $140a$-$c$.

When each circle segment $20a$-$c$ contains Q identifier values, only the part of the identifier that represents the position in the circle segment $20a$-$c$ needs to be output to multiplexer 144, since this part suffices to address the container in connection output interfaces $140a$-$c$.

The following is an example of a detection algorithm for determining the minimum and maximum in the case of T=2:

step a: scan all identifiers of all containers that have been received in a time frame, determining which values of the more significant bits (MSB) occur, and determining for each such value what the minimum and maximum value of the less significant bits (LSB);

step b: if only one value of the MSB has occurred compose the minimum identifier value from that MSB value and the minimum value of the LSB;

step c: generate an error if more than two different values of the MSB have been found in step a;

step d: generate an error if two different values of the MSB have been found and the difference between the values is more than one (modulo the maximum possible value of the MSB);

step e: generate an error if two different values of the MSB have been found and the maximum LSB value for a first one of the MSB values is higher than the minimum for a second one of the MSB value, where the first one of the MSB values is one higher than the second MSB value modulo the maximum possible MSB value; and step f: compose the minimum identifier value from the second one of the MSB values and the minimum LSB value for that second one of the MSB values.

Of course, the error generating steps may be omitted if it is guaranteed that the differences between the delays never exceed the maximum amount of delay that can be buffered.

Figure 3:
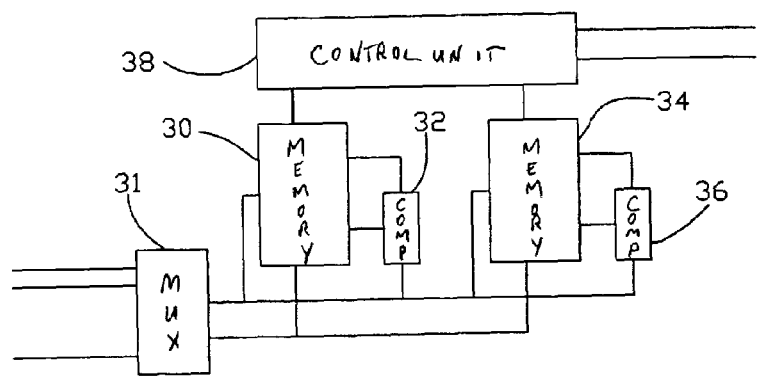
FIG. 3 shows an exemplary embodiment of a last container detector according to the principles of the invention.

FIG. 3 shows an example of a hardware embodiment of detector 142 for arbitrary T values. This embodiment contains a multiplexer 31, a memory for minima 30, a memory for maxima 34, a comparator for minima 32, a comparator formaxima 36 and a control unit 38. Outputs $122a$-$c$ of network 12 (not shown)are coupled to inputs of multiplexer 31. Multiplexer 31 has outputs for outputting a least significant part and a most significant part of the identifiers of the containers that are received from the connections through network 12. The output for the most significant part is coupled to address inputs of the memory for minima 30 and the memory for maxima 34. The output for the least significant part is coupled to first inputs of the comparators for minima and maxima 32, 26 and to data inputs of memories 30, 34. Data outputs of the memories for minima and maxima 30, 34 are coupled to second inputs of the comparators 32, 36 for minima and maxima respectively. The comparators for minima and maxima 32, 36 have outputs coupled to control inputs of the memories for minima and maxima 30, 34 respectively. Control unit 38 is coupled to the memories 30, 34.

In operation, the more significant parts of the identifiers identify the circle segments $20a$-$c$ to which the identifiers belong that have been received in a time frame via the different connections during a frame at the output $122a$-$c$ of network 12. Memories 30, 34 store the minimum and maximum values of the less significant parts of the values of the identifiers for each circle segment 20a-c. For each received identifier, memories 30, 34 retrieve a minimum and maximum value for the circle segment 20a-c identified by the more significant part of the identifier. Comparators 32, 36 compare these retrieved values with the less significant part of the received identifier and command the memories 30, 34 to store the less significant part if the less significant part is below or above the retrieved minimum or maximum value respectively.

Prior to the determination of maxima, memories for minima and maxima 30, 34 may be initialized to maximum and minimum possible values respectively. Preferably, memories 30, 34 also store information to indicate whether respective values of the more significant value have occurred at all for a give frame.

When detector 142 detects that the identifiers from all connections have been processed in this way, control unit 38 detects whether there is a collection of consecutive circle segments that contain all received identifier values, so that the number of circle segments in the collection does not exceed the threshold value. When the less significant part at least suffices to address the Q locations, this detection merely involves detection that no more than two values of the more significant part have occurred. Next, when the collection extends over the maximum allowable number of circle segments 20a-c, control unit 38 checks the difference between the minimum stored for the first segment of the collection and the maximum stored for the last segment of the collection is below a further threshold. When the less significant part of the identifiers stored memories 30, 34 addresses the Q locations available for Q containers, this detection merely involves detection that the maximum does not exceed the minimum.

Subsequently, control unit 38 outputs information identifying the minimum in the first circle segment to multiplexer 144, so as to retrieve the data from the containers of the group that has been completely received. When the less significant part at least suffices to address the Q locations, it suffices to output the less significant part of the identifier for the first circle segment from the memory for minima 30.

Although the invention has been illustrated in terms of a specific implementation of detector 142, it should be appreciated that the invention is not limited to this implementation. For example, instead of providing memory locations in memories 30, 34 for all possible values of the more significant part of the identifier, detector 142 may also provide T memory locations only for the maximum number T of such values that can occur without error. In this case, values that occur for the more significant part are used associatively to address respective ones of the memory locations.

The association may be implemented with conventional associative memory techniques. In one technique, only as much of a lower significant part X of the more significant part of the identifier is used to address the memories 30, 34 (X containing sufficient bits to address T memory locations). In this case, detector 142 checks that each location is always associated with the same value more significant part during processing of the identifiers from a frame. If not, an error is signaled.

If T=2, two memory locations suffice in each memory 30, 34, only the least significant bit of the more significant part of the identifier is needed for addressing. In fact, the detector can be simplified even further in this case.

Figure 4:
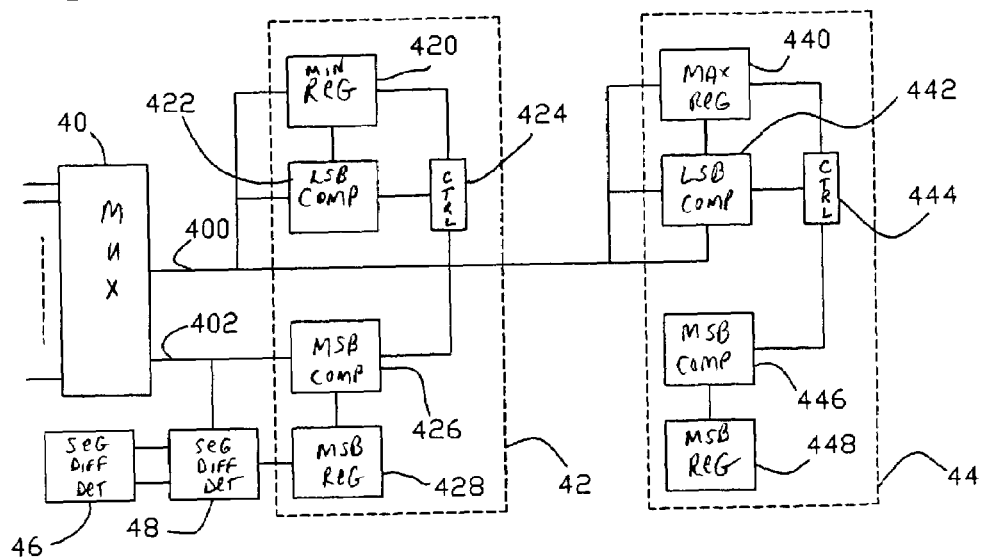
FIG. 4 shows another exemplary embodiment of last container detector according to the principles of the invention.

FIG. 4 shows an example of an embodiment of detector 142 for the case of T=2. The detector contains a multiplexer 40, a minimum detector 42, a maximum detector 44 and a segment difference detector circuit 46, 48. Multiplexer 40 has an LSB output 400 and an MSB output 402.

Minimum detector 42 contains a minimum register 420, an LSB comparator 422, an update control circuit 424, an MSB comparator 426 and an MSB register 428. LSB output 400 of multiplexer 40 is coupled to inputs of minimum register 420 and LSB comparator 422. Minimum register 420 has an output coupled to a further input of LSB comparator 422. LSB comparator 422 has an output coupled to update control circuit 424. MSB output 402 of multiplexer 40 is coupled to an input of MSB comparator 426. MSB register 428 has an output coupled to a further input of MSB comparator 426. MSB comparator 426 has an output coupled to update control circuit 424. Update control circuit 424 has an output connected to a control input of MSB register 420.

The structure of maximum detector 44 is similar to that of minimum detector 42. Maximum detector 44 contains a maximum register 440, an LSB comparator 442, an update control circuit 444, an MSB comparator 446 and an MSB register 448.

Segment difference detector circuit 46, 48 contains a status register 46 and a comparator unit 48. Comparator unit 48 has comparator inputs coupled to MSB output 402 of multiplexer 40 and MSB register 428 and an input/output interface coupled to status register 46. Status register and comparator unit 48 have outputs couplings (not shown) to the LSB registers 420, 440 and the MSB registers 428, 448 of the minimum detector 42 and the maximum detector 42.

In operation, the identifiers from the different containers that are received in the same time frame are applied to multiplexer 40. Multiplexer 40 outputs a more significant part and a less significant part of these identifiers to the MSB output 402 and the LSB output 400 respectively. Minimum detector 42 stores an MSB value and a minimum LSB value in MSB register 428 and LSB register 420 respectively. Minimum detector compares the MSB and LSB from multiplexer 40 with the stored value. If the MSB value from multiplexer 40 matches the MSB value in MSB register 428 and the LSB value from multiplexer is lower than the MSB value in MSB register 420, the LSB value from multiplexer 40 is copied into LSB register 420. Maximum detector operates similarly, except that the LSB value from multiplexer 40 is copied into maximum register 44 if it exceeds the LSB value in maximum register 440.

Initialization of the circuit is performed as follows. Initially, segment difference detector circuit 46, 48 copies the LSB and MSB of a first identifier into the LSB registers 420, 440 and the MSB registers 428, 448 of the minimum detector 42 and the maximum detector 42. Status register 46 assumes a first state indicative of the presence of identical MSB values in the MSB registers 428, 448.

When comparator unit 428 subsequently detects that an MSB from multiplexer 40 differs from the MSB value in MSB register 428 while status register 46 is in the first state, segment difference detector circuit 46, 48 again becomes active. If the MSB is not adjacent to the MSB in MSB register 428 an error signal is generated (by adjacent is meant that the difference between the MSB values is one, possibly after subtracting the maximum possible MSB value). Otherwise, segment difference detector circuit 46, 48 causes the MSB and LSB from multiplexer 40 to be copied into either minimum detector 42 or maximum detector 44, dependent on whether the MSB from multiplexer is next lower than the stored MSB value or next higher respectively. Status register 2 is updated to a second state indicative of different MSB values in the MSB registers 428, 448.

When comparator unit 428 subsequently detects that an MSB from multiplexer 40 differs from the MSB value in MSB register 428 and is not one higher than that value (possibly after adding the maximum possible MSB value) while status register 46 is in the second state, segment difference detector circuit 46, 48 generates an error signal.

Once identifiers from all containers have been processed in this way, the difference between the minimum and maximum values form minimum and maximum registers 428, 448 are compared if status register 46 is in the second state. If the maximum exceeds the minimum an error signal is generated. Otherwise, the minimum value and the MSB value in the MSB register 428 of minimum detector 42 is used to control retrieval of the buffered containers.

Effectively, the minimum and maximum detectors operate as one-location associative memories, with the MSB as an associative address. These memories are updated when an current LSB is lower or higher than the stored LSB. When it is guaranteed that the delays do not exceed a maximum error checking may be omitted in any case.

In other alternative implementations of the detector, the determination of the maxima and minima may executed in any way, for example by means of a suitably programmed microcontroller placing the maxima and minima in registers instead of memories, or in a single memory. Instead of comparison of parts of the identifiers with stored minima and maxima, comparisons between pairs of identifiers may be used to determine maxima and minima. Instead of sequential comparisons, some form of parallelized comparison may be used. Identifiers may read from the connection output interfaces 140*a-c* instead of from outputs 122*a-c*, and so on.

Although the invention has been illustrated in terms of a specific system, it should be appreciated that the invention is not limited to this system. As an example, although network 12 had been shown to have separate inputs and outputs for the connections, in fact, a combined input and/or output may be used, to which the containers are supplied in series, earmarked for different connections. As another example, although the illustration speaks of streams of data, which may be a simple unstructured sequence of data items, a stream may of course have any more complicated structure, as long as substantially the same structure is reproduced at output 146. The invention ensures that when the data is split into blocks that the data can be reconstructed when the data is transported via different connections that may cause different delays. Of course, not all of the incoming data need always be transmitted, e.g., if parts of the incoming data is not relevant at the output 146 or can easily be reconstructed, these parts may be omitted from the data in the containers. Also, although the invention has been illustrated in terms of an identifier that is incremented for successive groups, any form of changing the identifiers may of course be used, such as decrementing or more complex sequencing.

Furthermore, although the invention has been described in terms of transmission and reception of groups of blocks per time frame in parallel, some form of serialization of transmissions via different connections may of course be used as well. Also, the situation has been described where containers are transmitted and received via all connections. If it is possible that one or more connections temporarily do not output containers for some reason, however, detector 142 may merely suspend its activity until containers are received via all connections once more.

Similarly, although separate connection output interfaces 140*a-c*, each with its own memory, have been shown, it will be clear that memories for storing data from two or more, or even all, of the connections may be combined. In this case, multiplexer 144 merely addresses more locations in each memory. Also, although the use of part of the identifier to address these memories has been described, it will be appreciated that other forms of addressing may be used (for example addressing by means of a reception sequence number). However, in this case, a correspondence between the identifiers and the addresses needs to be administered.

In general, the foregoing embodiments are merely illustrative of the principles of the invention. Those skilled in the art will be able to devise numerous arrangements, which, although not explicitly shown or described herein, nevertheless embody those principles that are within the scope of the invention. The scope of the invention is limited only by the claims appended hereto.

what is claimed is:

1. A method of transporting data via a plurality of connections through a network, wherein incoming data is distributed over the connections in successive groups of containers, respective containers of each group being transmitted via respective ones of the connections, each with an identifier of the group to which the container belongs, a repeating sequence of identifiers being used, the method comprising:
    buffering data from containers that have been received via the connections in a buffer memory;
    detecting an oldest identifier value received via the connections during a time frame by
        determining a plurality of respective minimum values of the identifiers received in the time frame, each minimum value being determined among received identdiers from a respective sub-range of possible identifier values,
        identifying a sequentially first sub-range of a plurality of successive sub-ranges for which at least one of the minimum values have been determined, and
        selecting the minimum value of the sequentially first sub-range as oldest identifier; and
    outputting containers with the oldest identifier from the buffer memory.

2. The method according to claim 1, wherein the buffer memory has a capacity for storing data from a number Q of groups of containers simultaneously, each sub-range containing said number Q of possible identifier values.

3. The method according to claim 2, further comprising:
    testing whether the identifiers are spread over no more than a predetermined number T of consecutive ones of the sub-ranges;
    determining respective maximum values of the identifiers received in the time frame, each maximum being determined for identifiers from a respective one of the sub-range;
    determining a sequentially last sub-range of a plurality of successive sub-ranges for which one of the minimum values have been determined;
    selecting a maximum value of sequentially last sub-range;
    comparing the selected maximum value with the minimum value from the sequentially first sub-range; and
    reporting an error if set first test is negative or the selected maximum value differs more than a predetermined amount from the selected minimum value.

4. A data communication system including an input interface, an output interface and a network arranged to provide a plurality of data transport connections between the input interface and output interface, the input interface being arranged to transmit incoming data distributed over the connections in successive groups of containers, respective containers of each group being transmitted via respective ones of the connections, each with an identifier of the group to which the container belongs, the output interface comprising buffer memory for buffering data from received containers until all containers of a group have been received, the output interface comprising a detector for detecting an identifier value of an oldest identifier value received via the connections, the output interface outputting the containers with the oldest identifier value from the buffer memory, the detector determining a plurality of respective minimum values of the identifiers received in the time frame, each minimum value being determined among received identifiers from a respective sub-range of possible identifier values, identifying a sequentially first sub-range of a plurality of successive sub-ranges for which at least one of the minimum values have been determined, and selecting the minimum value of the sequentially first sub-range as oldest identifier.

5. The system according to claim 4, wherein the buffer memory has a capacity for storing data from a number Q of groups of containers simultaneously, each sub-range containing said number Q of possible identifier values.

6. The system according to claim 5, wherein the detector is arranged to:
    test whether the identifiers are spread over no more than a predetermined number T of consecutive sub-ranges;
    determine respective maximum values of the identifiers received in the time frame, each maximum being determined for identifiers from a respective one of the sub-range;
    determine a sequentially last sub-range of a plurality of successive sub-ranges for which one of the minimum values have been determined;
    select a maximum value of sequentially last sub-range;
    compare the selected maximum value with the minimum value from the sequentially first sub-range; and
    report an error if set first test is negative or the selected maximum value differs more than a predetermined amount from the selected minimum value.

7. An output interface apparatus for coupling to connection outputs of a network that transmits data distributed over the connections in successive groups of containers, respective containers of each group being transmitted via respective ones of the connections, each with an identifier of the group to which The container belongs, a repeating sequence of identifiers being used, the output interface comprising:
    a buffer memory for buffering data from received containers until all containers of a group have been received; and
    a detector for detecting an identifier value of an oldest identifier value received via the connections, the output interface outputting the containers with the oldest identifier value from the buffer memory, determining a plurality of respective minimum values of the identifiers received in the time frame, each minimum value being determined among received identifiers from a respective sub-range of possible identifier values, identifying a sequentially first sub-range of a plurality of successive sub-ranges for which at least one of the minimum values have been determined, and selecting the minimum value of the sequentially first sub-range as oldest identifier.

* * * * *